US012772045B2

(12) United States Patent
Kandula et al.

(10) Patent No.: US 12,772,045 B2
(45) Date of Patent: Oct. 20, 2026

(54) PREDICTING WHETHER A MOBILE DEVICE WILL JOIN A WIRELESS TELECOMMUNICATION NETWORK

(71) Applicant: T-Mobile USA, Inc., Bellevue, WA (US)

(72) Inventors: Lema Kandula, Frisco, TX (US); Amina Noor, Sammamish, WA (US); Mohammad Mustafa Bari, Woodinville, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 314 days.

(21) Appl. No.: 18/531,194

(22) Filed: Dec. 6, 2023

(65) Prior Publication Data

US 2025/0193658 A1 Jun. 12, 2025

(51) Int. Cl.
*H04W 8/24* (2009.01)
*H04W 76/10* (2018.01)

(52) U.S. Cl.
CPC ............ *H04W 8/24* (2013.01); *H04W 76/10* (2018.02)

(58) Field of Classification Search
CPC ................................ H04W 8/24; H04W 76/10
See application file for complete search history.

(56) References Cited

U.S. PATENT DOCUMENTS 6,119,012 A 9/2000 Amirijoo
6,721,557 B1 4/2004 Ritter
7,774,020 B2 8/2010 Songer
7,849,135 B2 12/2010 Agrawal et al.
8,189,549 B2 5/2012 Caldwell et al.
8,306,518 B1 11/2012 Gailloux et al.
8,626,233 B2 1/2014 Hossain et al.
9,020,523 B2 4/2015 Moeglein et al.
9,456,337 B2 9/2016 Amerga et al.
9,572,165 B2 2/2017 Keerthi
9,615,202 B2 4/2017 Dal Santo et al.
9,788,221 B2 10/2017 Onishi
(Continued)

FOREIGN PATENT DOCUMENTS

CN 104221411 A 12/2014
CN 104246785 A 12/2014
(Continued)

*Primary Examiner* — Kodzovi Acolatse
*Assistant Examiner* — Maryam Emadi
(74) *Attorney, Agent, or Firm* — Ashurst Perkins Coie US LLP

(57) ABSTRACT

The system obtains multiple attributes of the UE, where the multiple attributes include: a lead age, an indication of a DUNS confidence score, an indication of whether a website of the UE is provided, and an indication of a source of the UE. The lead age indicates an amount of time since the UE contacted the wireless telecommunication network. The DUNS confidence score indicates reliability of the UE. The source of the UE indicates whether the UE entered the physical premises of the wireless telecommunication network. The system provides the multiple attributes to an AI and obtains from the AI an indication of whether the UE will join the wireless telecommunication network. Upon determining that the UE will join the wireless telecommunication network, the system initiates a communication with the UE.

20 Claims, 7 Drawing Sheets

(56) References Cited

U.S. PATENT DOCUMENTS

| | | | |
|---|---|---|---|
| 9,820,232 | B2 | 11/2017 | Zappi et al. |
| 10,117,090 | B2 | 10/2018 | Jahangir et al. |
| 10,440,678 | B2 | 10/2019 | Hedley et al. |
| 10,560,845 | B1 | 2/2020 | Manepalli et al. |
| 10,637,870 | B2 | 4/2020 | Do et al. |
| 10,645,582 | B2 | 5/2020 | Wohlert et al. |
| 10,694,325 | B2 | 6/2020 | Robertson et al. |
| 11,006,268 | B1 | 5/2021 | Kim et al. |
| 11,159,296 | B2 | 10/2021 | Nammi et al. |
| 11,178,028 | B1 | 11/2021 | Maseedu |
| 11,202,212 | B2 | 12/2021 | Karanam |
| 11,210,606 | B1 | 12/2021 | Morgan et al. |
| 11,297,513 | B2 | 4/2022 | Agarwal et al. |
| 11,337,096 | B2 | 5/2022 | Saluja et al. |
| 11,343,381 | B2 | 5/2022 | Zhang et al. |
| 11,424,039 | B1 | 8/2022 | Modi et al. |
| 11,449,892 | B2 | 9/2022 | Singh |
| 11,470,490 | B1 | 10/2022 | Tuli et al. |
| 11,489,742 | B2 | 11/2022 | Maseedu |
| 11,490,329 | B1 | 11/2022 | Artuso |
| 11,510,050 | B2 | 11/2022 | Kim et al. |
| 11,526,388 | B2 | 12/2022 | Prakash et al. |
| 11,575,671 | B2 | 2/2023 | Manepalli et al. |
| 11,617,093 | B1 | 3/2023 | Artuso |
| 11,722,388 | B2 | 8/2023 | Maseedu |
| 11,743,393 | B2 | 8/2023 | Zhang et al. |
| 11,751,087 | B2 | 9/2023 | Saluja et al. |
| 11,765,604 | B2 | 9/2023 | Blizard et al. |
| 11,770,307 | B2 | 9/2023 | Veggalam et al. |
| 11,800,398 | B2 | 10/2023 | Amer |
| 2005/0143097 | A1 | 6/2005 | Wilson et al. |
| 2005/0227678 | A1 | 10/2005 | Agrawal et al. |
| 2006/0142021 | A1 | 6/2006 | Mueckenheim et al. |
| 2006/0276202 | A1 | 12/2006 | Moeglein et al. |
| 2008/0043675 | A1 | 2/2008 | Mousseau et al. |
| 2008/0043676 | A1 | 2/2008 | Mousseau et al. |
| 2010/0128624 | A1 | 5/2010 | Lee et al. |
| 2010/0265913 | A1 | 10/2010 | Gorokhov et al. |
| 2012/0268269 | A1 | 10/2012 | Doyle |
| 2015/0079966 | A1 | 3/2015 | Govindarajeswaran et al. |
| 2018/0300324 | A1 | 10/2018 | Ziraknejad et al. |
| 2019/0164165 | A1 | 5/2019 | Ithabathula |
| 2019/0180011 | A1* | 6/2019 | Reinsberg ............... G06F 21/31 |
| 2020/0008271 | A1* | 1/2020 | Pennington ............. H04L 69/18 |
| 2021/0092791 | A1 | 3/2021 | Jeong et al. |
| 2022/0109673 | A1 | 4/2022 | Robinson-morgan et al. |
| 2022/0167346 | A1 | 5/2022 | Lekutai et al. |
| 2023/0014814 | A1 | 1/2023 | Seward et al. |
| 2023/0019479 | A1 | 1/2023 | Artuso |
| 2023/0026228 | A1 | 1/2023 | Robinson-morgan et al. |
| 2023/0106566 | A1 | 4/2023 | Hua et al. |
| 2023/0131468 | A1 | 4/2023 | Amer |
| 2023/0169424 | A1 | 6/2023 | Gardini Vedovatto |
| 2023/0171146 | A1 | 6/2023 | Gardini Vedovatto |
| 2023/0199515 | A1 | 6/2023 | Artuso |
| 2023/0209351 | A1 | 6/2023 | Djankovic et al. |
| 2023/0246676 | A1 | 8/2023 | Reeves |
| 2023/0269000 | A1 | 8/2023 | Rahman |
| 2023/0292206 | A1 | 9/2023 | Reeves |
| 2023/0300588 | A1 | 9/2023 | Chiang et al. |
| 2023/0300589 | A1 | 9/2023 | Chiang et al. |
| 2023/0319600 | A1 | 10/2023 | Blizard et al. |
| 2023/0328522 | A1 | 10/2023 | Shah |
| 2023/0345213 | A1 | 10/2023 | Engelhart |
| 2023/0354029 | A1 | 11/2023 | Ahmet |
| 2023/0362583 | A1 | 11/2023 | Rahman |
| 2023/0362619 | A1 | 11/2023 | Arends et al. |
| 2023/0362655 | A1 | 11/2023 | Farag et al. |
| 2025/0184852 | A1* | 6/2025 | Chopade ............. H04W 36/302 |

FOREIGN PATENT DOCUMENTS

| | | | |
|---|---|---|---|
| CN | 104396288 | A | 3/2015 |
| CN | 104584642 | A | 4/2015 |
| CN | 103004278 | B | 9/2016 |
| CN | 107113303 | A | 8/2017 |
| CN | 105144140 | B | 12/2017 |
| CN | 106164997 | B | 7/2019 |
| CN | 107113760 | B | 5/2020 |
| CN | 107548568 | B | 10/2020 |
| CN | 109716796 | B | 2/2021 |
| CN | 112306988 | A | 2/2021 |
| CN | 108989987 | B | 9/2021 |
| CN | 108885659 | B | 2/2022 |
| CN | 109302727 | B | 5/2022 |
| CN | 109089274 | B | 6/2022 |
| CN | 112584441 | B | 3/2023 |
| CN | 111176698 | B | 9/2023 |
| DE | 112016002945 | T5 | 5/2018 |
| DE | 112017004452 | T5 | 6/2019 |
| DE | 112016000268 | B4 | 7/2019 |
| DE | 112018005558 | T5 | 6/2020 |
| DE | 112018007750 | T5 | 3/2021 |
| EP | 1565837 | A2 | 8/2005 |
| EP | 1886516 | A2 | 2/2008 |
| EP | 1766885 | B1 | 4/2010 |
| EP | 2377269 | A1 | 10/2011 |
| EP | 2380096 | A2 | 10/2011 |
| EP | 1518435 | B1 | 2/2012 |
| EP | 2417796 | A1 | 2/2012 |
| EP | 2428067 | A1 | 3/2012 |
| EP | 2668815 | A1 | 12/2013 |
| EP | 2828767 | A1 | 1/2015 |
| EP | 2832123 | A1 | 2/2015 |
| EP | 3020180 | A1 | 5/2016 |
| EP | 3241389 | B1 | 10/2018 |
| EP | 3430419 | A1 | 1/2019 |
| EP | 3440855 | A1 | 2/2019 |
| EP | 3514752 | A1 | 7/2019 |
| EP | 3526752 | A1 | 8/2019 |
| EP | 2756611 | B1 | 10/2019 |
| EP | 3516887 | B1 | 10/2021 |
| EP | 3314411 | B1 | 9/2022 |
| EP | 3202172 | B1 | 6/2023 |
| JP | 2000516061 | A | 11/2000 |
| JP | 2005530430 | A | 10/2005 |
| JP | 2010532971 | A | 10/2010 |
| JP | 5519872 | B2 | 4/2014 |
| JP | 2014147066 | A | 8/2014 |
| JP | 5770310 | B2 | 7/2015 |
| JP | 2016525834 | A | 8/2016 |
| JP | 2017532069 | A | 11/2017 |
| JP | 6374519 | B2 | 7/2018 |
| JP | 6397138 | B2 | 9/2018 |
| JP | 6461197 | B2 | 1/2019 |
| JP | 2019528628 | A | 10/2019 |
| JP | 6913241 | B2 | 7/2021 |
| JP | 7241354 | B2 | 3/2023 |
| JP | 7311345 | B2 | 7/2023 |
| KR | 101149968 | B1 | 6/2012 |
| KR | 101205915 | B1 | 11/2012 |
| KR | 101481390 | B1 | 1/2015 |
| KR | 101842634 | B1 | 3/2018 |
| KR | 101943174 | B1 | 1/2019 |
| KR | 101993569 | B1 | 6/2019 |
| KR | 101996263 | B1 | 7/2019 |
| KR | 102074754 | B1 | 3/2020 |
| KR | 102153272 | B1 | 9/2020 |
| KR | 102495118 | B1 | 2/2023 |
| WO | 0030395 | A1 | 5/2000 |
| WO | 03107713 | A1 | 12/2003 |
| WO | 2004025421 | A2 | 3/2004 |
| WO | 2006124473 | A2 | 11/2006 |
| WO | 2007094816 | A2 | 8/2007 |
| WO | 2010057131 | A1 | 5/2010 |
| WO | 2010060440 | A2 | 6/2010 |
| WO | 2010102242 | A2 | 9/2010 |
| WO | 2010121199 | A1 | 10/2010 |
| WO | 2011006006 | A2 | 1/2011 |
| WO | 2011050540 | A1 | 5/2011 |
| WO | 2012145524 | A1 | 10/2012 |
| WO | 2013142573 | A1 | 9/2013 |
| WO | 2013148402 | A1 | 10/2013 |
| WO | 2014158205 | A1 | 10/2014 |

(56) References Cited

FOREIGN PATENT DOCUMENTS

| | | | |
|---|---|---|---|
| WO | 2015005962 | A1 | 1/2015 |
| WO | 2015006690 | A1 | 1/2015 |
| WO | 2015184184 | A2 | 12/2015 |
| WO | 2016073935 | A1 | 5/2016 |
| WO | 2016109210 | A1 | 7/2016 |
| WO | 2017093801 | A2 | 6/2017 |
| WO | 2017102149 | A1 | 6/2017 |
| WO | 2017156574 | A1 | 9/2017 |
| WO | 2017166221 | A1 | 10/2017 |
| WO | 2017176698 | A1 | 10/2017 |
| WO | 2018057162 | A1 | 3/2018 |
| WO | 2018068088 | A1 | 4/2018 |
| WO | 2018132328 | A1 | 7/2018 |
| WO | 2018195106 | A1 | 10/2018 |
| WO | 2018213079 | A1 | 11/2018 |
| WO | 2018231346 | A1 | 12/2018 |
| WO | 2019136054 | A1 | 7/2019 |
| WO | 2020118019 | A1 | 6/2020 |
| WO | 2020123378 | A1 | 6/2020 |
| WO | 2020159897 | A1 | 8/2020 |
| WO | 2020176189 | A1 | 9/2020 |
| WO | 2020202121 | A1 | 10/2020 |
| WO | 2021027317 | A1 | 2/2021 |
| WO | 2021041014 | A1 | 3/2021 |
| WO | 2021231198 | A1 | 11/2021 |
| WO | 2021236212 | A1 | 11/2021 |

* cited by examiner 340 400

| | Column Name | Data Type |
|---|---|---|
| 402 | DATA_QUALITY_SCORE | double |
| 404 | LEAD_AGE | double |
| 406 | SOURCE | string |
| 408 | STATE | string |
| 410 | PHONE_NUMBER_PROVIDED | string |
| 412 | WEBSITE_PROVIDED | string |
| 414 | DUNS_NUMBER_EXIST | string |
| 416 | OPTED_OUT_OF_PHONE_OR_NOT | string |
| 418 | COMPANY_PHONE_NUMBER_PROVIDED | string |
| 420 | NUMBER_OF_EMPLOYEES | integer |
| 422 | OWNER_SEGMENT | string |
| 424 | INDUSTRY | string |
| 426 | ANNUAL_REVENUE | double |
| 428 | TITLE | string |
| 430 | PARDOT_SCORE | string |
| 432 | PARDOT_GRADE | string |
| 434 | OPTED_OUT_OF_EMAIL_OR_NOT | string |
| 436 | BUSINESS_DOMAIN_OR_NOT | string |
| 438 | EMAIL_CATEGORY | string |
| 440 | LEAD_DESCRIPTION_PROVIDED | string |
| 442 | COMPANY_NAME_PROVIDED | string |
| 444 | INBOUND_OR_OUTBOUND | string |
| 446 | DUNS_CONFIDENCE_SCORE_ABOVE_6_OR_NOT | string |
| 448 | LEAD_ID | string |
| 450 | CAMPAIGN_NAME | string |
| 452 | LEAD_TO_OPPORTUNITY_CONVERSION | string |
| 454 | PROPENSITY_SCORE | double |

*FIG. 4*

PREDICTING WHETHER A MOBILE DEVICE WILL JOIN A WIRELESS TELECOMMUNICATION NETWORK

BACKGROUND

Many users of mobile devices can establish contact with a wireless telecommunication network inquiring about adding a mobile device to the network. However, even after reaching out to the users, many of the users do not join the network, thus leading to lost time and effort.

BRIEF DESCRIPTION OF THE DRAWINGS

Detailed descriptions of implementations of the present invention will be described and explained through the use of the accompanying drawings.

FIG. 4 shows multiple attributes provided to the AI to make a prediction.

Figure 1:
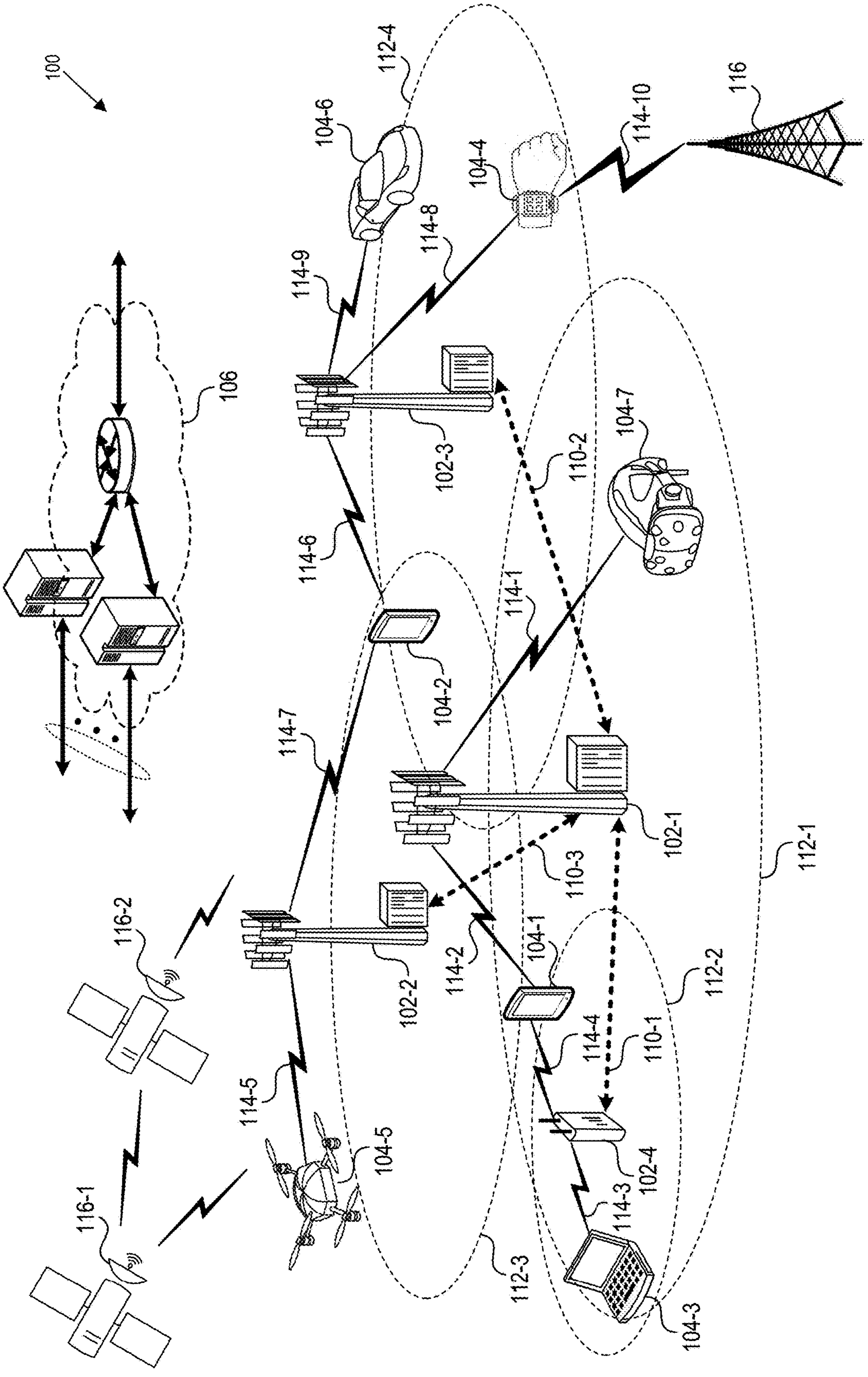
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system to predict whether a mobile device will join a wireless telecommunication network. The mobile device can be a new voice line, a new mobile device, a new Internet of Things (IOT) device, an upgraded device, etc. The system obtains multiple attributes associated with the mobile device, where the multiple attributes include a numerical value type or a categorical value type. Further, the multiple attributes include a lead age, an indication of a Data Universal Numbering System (DUNS) confidence score, an indication of whether a website associated with the mobile device is provided, and an indication of a source associated with the mobile device.

The lead age indicates an amount of time since the mobile device contacted the wireless telecommunication network. The DUNS confidence score indicates reliability associated with the mobile device. The source associated with the mobile device indicates whether the mobile device entered the physical premises associated with the wireless telecommunication network.

The system converts a portion of the multiple attributes having the categorical value into the numerical value type to obtain a converted attribute. The system provides the converted attribute and a portion of the multiple attributes having the numerical value type to an AI. The system obtains obtain from the AI an indication of whether the mobile device will join the wireless telecommunication network. Upon determining that the mobile device will join the wireless telecommunication network, the system initiates a communication associated with the mobile device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., IoT, mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a UE, a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
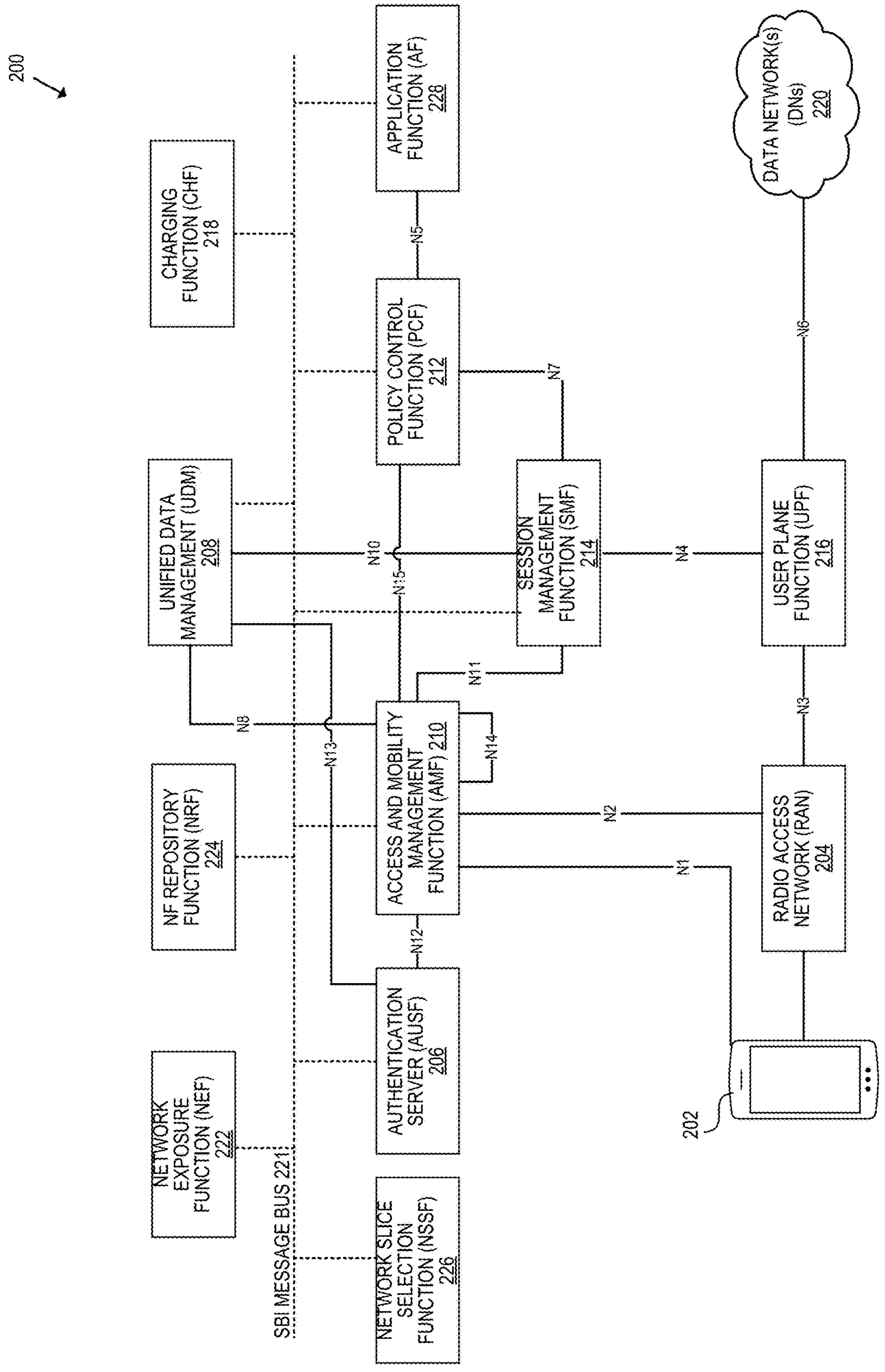
FIG. 2 is a block diagram that illustrates an architecture including 5G core network functions (NFs) that can implement aspects of the present technology.

FIG. 2 is a block diagram that illustrates an architecture 200 including 5G core NFs that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
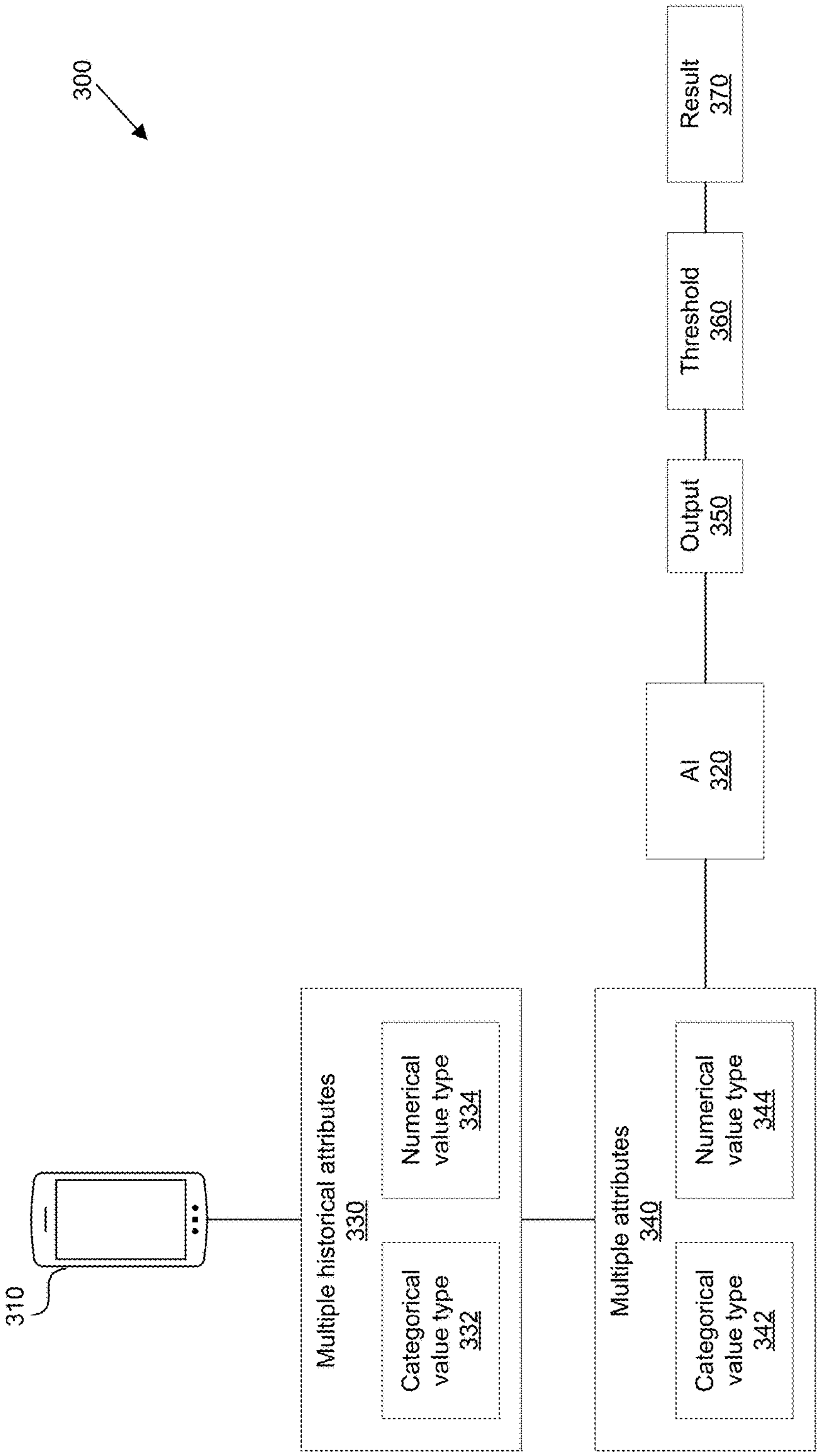
FIG. 3 shows a system to train an artificial intelligence (AI) to predict whether a user equipment (UE) will join the network.

Predicting Whether a Mobile Device Will Join a Wireless Telecommunication Network FIG. 3 shows a system 300 to train an AI to predict whether a UE will join the network 100 in FIG. 1. The UE 310 can include a UE associated with adding a new voice line, a UE enabling a mobile virtual network operator (MVNO), a new IoT device, or a UE operating an existing device on the network 100. The UE 310 can establish a contact with the network 100 by, for example, visiting a website associated with the network, visiting a physical premises associated with network, e.g., a brick-and-mortar store, providing information to the network, etc.

Currently, the network 100 can receive several million contacts every year, follow up with 64% of them, and convert only 0.15% of the received contacts. By contrast, the AI 320 can suggest follow-up with contacts out of which approximately 14% join the network 100.

The system 300 obtains multiple historical attributes 330 associated with the UE, as described in this application. The multiple historical attributes 330 can include categorical value type 332 and numerical value type 334.

In addition, the system 300 can perform feature engineering and obtain training data including multiple attributes 340 from the multiple historical attributes 330. The system 300 can train the AI 320 using the multiple attributes 340. Using feature engineering, the system 300 determines a correlation between a particular attribute among the multiple historical attributes 330 and the UE 310 associated with the attribute joining the network 100.

Specifically, the system 300 can obtain various hypotheses such as "contacts coming to inbound marketing have higher chances of joining the network" or "contacts with nonbusiness email domains join the network at lower rates." The system can determine the truthfulness of those hypotheses by analyzing the multiple historical attributes 330 and determining the correlation between a particular attribute among the multiple historical attributes 330 and the UE 310 associated with the attribute joining the network 100. If the correlation is high, whether positive or negative, the attribute can be included in the training data provided to the AI 320.

The system 300 can normalize the correlations to a particular range such as 0 to 100. In other words, the system can compute an absolute value of the correlations and adjust the value of the correlations so that all the correlations add up to 100. The system 300 can rank the correlations and select the top correlations that sum up to a predetermined threshold such as 90 or 95. The rest of the correlations can be discarded. Consequently, the system 300 can provide multiple attributes 340 associated with the selected correlations to the AI 320. The attribute associated with the discarded correlations can also be discarded. The system 300 can convert the categorical value type 342 into numerical value type 344 prior to providing them to the AI 320.

The AI 320 can provide the output 350, which can be a numerical value in a predetermined range such as 0 to 1 or 0 to 100. The system 300 can compare the output 350 to a threshold 360 to obtain an indication 370 of whether the UE 310 will join the network 100. For example, if the output 350 is above the threshold 360, the system 300 can determine that the UE 310 will join the network 100, otherwise the UE 310 will not join the network.

The system 300 can increase or lower threshold 360 depending on the indication to emphasize precision or recall. Precision indicates how often the AI 320 is correct in predicting that the UE 310 will join the network 100. Recall indicates whether the AI 320 can predict all UEs 310 that will join the network 100. Based on the indication of whether to emphasize the precision or the recall, the system can adjust the threshold 360. Specifically, the system 300 can increase the threshold 360 to increase precision and decrease the threshold to increase recall.

In addition, the AI 320 can predict whether the lifetime value of UE 310 to the network 100 is higher or lower compared to the rest of the UEs. To determine the relative lifetime value of the UE 310, the AI 320 can consider various attributes such as number of employees of the entity associated with the UE and company revenue of the entity.

FIG. 4 shows multiple attributes provided to the AI to make a prediction. The multiple attributes 340 include attributes 402-446 that are relevant to making the prediction of whether the UE will join the network 100 in FIG. 1 or the lifetime value of the UE joining the network. The attribute 452 in 340 is the target variable, also known as dependent variable in the literature, that is used to train the model in addition to attributes from 402 through 446. The attributes 448 and 450 in 340 are unit of analysis, the entity that uniquely identify a UE. The attribute 454 is the prediction of whether the UE will join the network 100 in FIG. 1, that the AI will output. Column 400 indicates a type of the attribute whether the attribute is numerical type or categorical type. Data types "double" and "integer" indicates numerical attributes, while data type "string" indicates categorical attributes that need to be converted to numerical attributes.

Data quality score 402 indicates the overall quality of the data. If a lot of data is missing and needs to be filled in, the data quality score goes down. The data quality score can vary between 1 and 100.

Lead age 404 indicates a time since the lead has been entered into the system, for example, in days. A lead can be information associated with the UE such as contact information including email address, phone number, and/or physical address. Source 406 indicates at which entry point of the network 100 in FIG. 1 the lead came in, such as whether the lead is walk-in, namely, whether the UE physically entered premises associated with the network. A walk-in lead has a high impact toward the result.

State 408 indicates a state in the United States where the lead is located. Phone number provided 410 can assume Yes/No values. "Yes" value indicates that the phone number has been provided by the lead while "No" value indicates that the phone number has not been provided by the lead. Website provided 412 can also assume Yes/No values. "Yes" value indicates that the website has been provided by the lead and "No" value indicates that the website has not been provided by the lead.

DUNS number exist 414 can assume Yes/No values, indicating whether the DUNS number exists or not. The DUNS number is a nine-digit number assigned to each business location having a unique, separate, and distinct operation for the purpose of identifying each business.

Opted out of phone or not 416 can assume Yes/No values indicating whether the lead has opted out of phone communication or not. Company phone number provided 418 can assume Yes/No values indicating whether the lead has provided a company phone number or not. Number of employees 420 indicates the number of employees in the lead's company.

Owner segment 422 indicates the network 100's segment that the lead belongs to, such as Inside sales. Industry 424 indicates a type of industry to which the lead's company belongs. Annual revenue 426 indicates annual revenue of the lead's company. Title 428 indicates a title of the lead and can include five categories: director level, manager level, vice president level/head of department, chief officer/owner, other. Pardot score 430 can be assigned to a predetermined range such as between 0 and 19. Pardot grade 432 can indicate the network 100's interest associated with the UE.

Opted out of email or not 434 can assume Yes/No values and indicate whether the lead has opted out of email communication or not. Business domain or not 436 can assume Yes/No values and can indicate whether the lead's email has a business domain or not. Email category 438 can indicate one of the predetermined categories based on domain address. The predetermined categories can include international, commercial, educational, government, null/invalid, and/or unknown domain address.

The description provided 440 can assume Yes/No values indicating whether the lead's description exists in the data or not. Company name provided 442 can assume Yes/No values and can indicate whether the lead provided a company name or not. Inbound or outbound 444 indicates whether the lead is inbound, e.g., a lead who came to the network 100, or outbound, e.g., a lead approached by the network or other lead source.

DUNS confidence score 446 can assume Yes/No values indicating that the DUNS confidence score is 6 and above or not. The DUNS confidence score 446 can vary in the range of 0 to 10 and can indicate how reliable an entity associated with the UE is. Confidence value of 0 indicates low confidence while confidence value of 10 indicates high confidence. Lead ID 448 is an ID unique to each lead. Campaign name 450 identifies the campaign assigned to each lead. Lead to opportunity conversion 452 can assume Yes/No values and can indicate whether the lead has been converted to an opportunity or not. Propensity score 454 is a score assigned by the AI in the range 0 to 100. The higher the score, the better the probability of the UE joining the network.

Each attribute 402-454 can have multiple values, where each value is associated with a UE. Sometimes, certain values among the multiple values can be missing. If less than a predetermined threshold of values is missing, such as 30% or less of values are missing, the system can generate a replacement value for the missing value. The replacement value can be 0 or can be the mean of the currently existing values. However, if there are more than 30% of the values missing, the system can disregard the particular attribute and not provide it to the AI.

Figure 5:
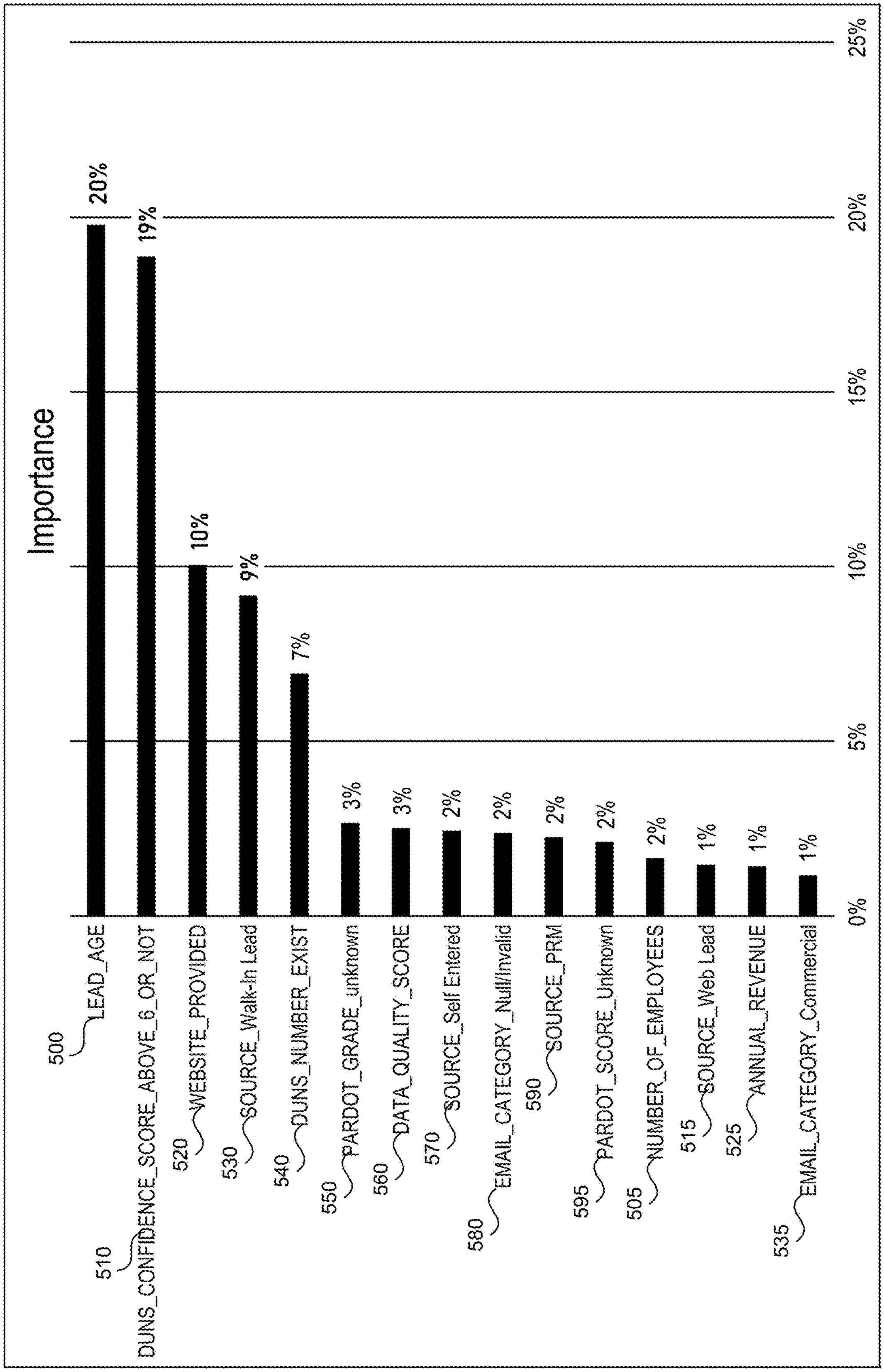
FIG. 5 shows the most influential attributes used by the AI to make a prediction.

FIG. 5 shows the most influential attributes used by the AI to make a prediction. As can be seen in FIG. 5, for the given dataset, the most influential attributes in order are lead age 500, DUNS confidence score above 6 or not 510, website provided 520, source 530, and DUNS number exists 540. Less important leads include Pardot grade 550, data quality score 560, whether the source is self-entered 570, whether email category is null or invalid 580, whether the source is from a partner relationship management 590, whether Pardot score is known 595, number of employees 505, whether the source is a web lead 515, annual revenue 525, and whether the email category is commercial 535.

Figure 6:
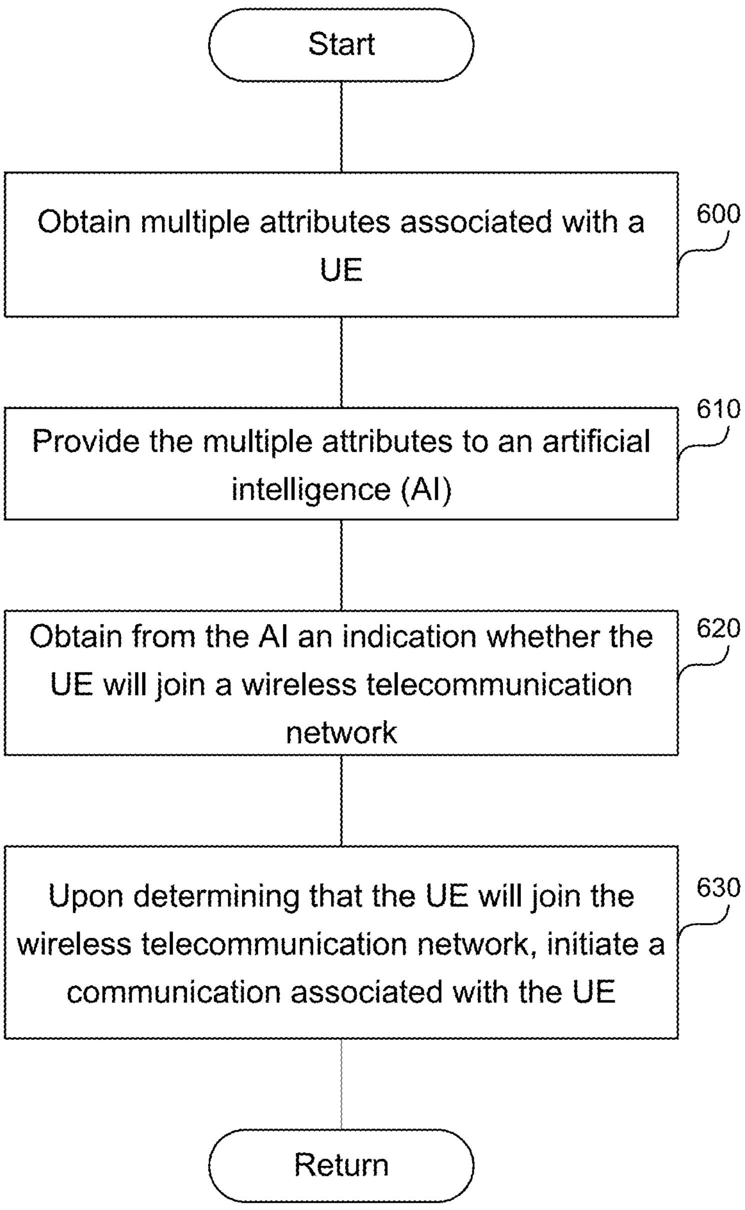
FIG. 6 is a flowchart of a method to predict whether a UE will join a wireless telecommunication network.

FIG. 6 is a flowchart of a method to predict whether a UE will join a wireless telecommunication network. The UE can be a new voice line, a new mobile device, a new IoT device, an upgraded device, etc. A hardware or software processor executing instructions describing this application can in step 600 obtain multiple attributes associated with the UE, where the multiple attributes include a numerical value type or a categorical value type. The multiple attributes can include at least two of: a lead age, an indication of a DUNS confidence score, an indication of whether a website associated with the UE is provided, and an indication of a source associated with the UE.

The lead age can indicate an amount of time since the UE contacted the wireless telecommunication network. The DUNS confidence score can indicate reliability associated with the UE. The source associated with the UE can indicate whether the UE entered the physical premises associated with the wireless telecommunication network. The processor can convert a portion of the multiple attributes having the categorical value into the numerical value type to obtain multiple attributes, all of which have the numerical value type.

In step 610, the processor can provide the multiple attributes to an AI, where all of the multiple attributes are of the numerical value type. In step 620, the processor can obtain from the AI an indication of whether the UE will join the wireless telecommunication network. The processor can generate a ranked list based on indication, where the ranked list is ordered from most likely to join the wireless telecommunication network to least likely. In step 630, upon determining that the UE will join the wireless telecommunication network, the processor can initiate a communication associated with the UE.

In addition to the attributes described above, the processor can obtain other attributes including: an indication of whether the DUNS confidence score exists, an indication of whether a Pardot grade is known, an indication of the data quality score, an indication of whether the source is self-entered, an indication of the email category, an indication of whether a Pardot score is unknown, an indication of a number of employees, an indication of whether the source is from Internet, an indication of an annual revenue associated with the UE, or an indication of whether the email associated with the UE is commercial. The Pardot grade can indicate the wireless telecommunication network interest associated with the UE. The data quality score can indicate quality of data associated with the UE. The indication of the email category can indicate whether the UE is associated with an international institution, commercial institution, educational institution, government institution, whether the email is provided, or whether the domain addresses unknown.

The processor can use random forest technique to generate training data by testing various hypotheses. Specifically, the processor can obtain multiple historical attributes associated with multiple UEs not belonging to the wireless telecommunication network. The multiple historical attributes can include a second lead age associated with the second UE among the multiple UEs, a second indication of a DUNS confidence score associated with the second UE among the multiple UEs, a second indication of whether a second website associated with the second UE among the multiple UEs is provided, and a second indication of a second source associated with the second UE among the multiple UEs. The processor can analyze the multiple historical attributes to determine a correlation between a historical attribute among the multiple historical attributes and an indication that the second UE associated with the historical attribute joined the wireless telecommunication network. The processor can determine whether the correlation satisfies a predetermined threshold. The correlation can be positive or negative. Upon determining that the correlation satisfies a predetermined threshold, the processor can generate training data based on the multiple historical attributes, where the training data includes the historical attribute and an indication of whether the second UE associated with the historical attribute joined the wireless telecommunication network. The processor can train the AI using the training data.

The processor can use relevant attributes to make to the prediction, and discard the others. Specifically, the processor can obtain multiple historical attributes associated with multiple UEs not belonging to the wireless telecommunication network. The multiple historical attributes can include a second lead age associated with the second UE among the multiple UEs, a second indication of a DUNS confidence score associated with the second UE among the multiple UEs, a second indication of whether a second website associated with the second UE among the multiple UEs is provided, and a second indication of a second source associated with the second UE among the multiple UEs. The processor can analyze the multiple historical attributes to determine a correlation between a historical attribute among the multiple historical attributes and an indication that the second UE associated with the historical attribute joined the wireless telecommunication network. The processor can obtain multiple indications associated with multiple correlations between the multiple historical attributes and multiple indications of the multiple UEs that joined the wireless telecommunication network. The multiple indications can correspond to absolute values of the multiple correlations. The processor can normalize the multiple indications associated with multiple correlations to a predetermined range, such as 0 to 100. The processor can rank the multiple indications associated with the multiple correlations in decreasing order to obtain a ranked list. The processor can select a portion of the multiple indications from the ranked list, where the portion of the multiple indications satisfies a predetermined threshold within the predetermined range. The predetermined threshold can be between 90 and 95. The processor can generate training data based on the portion of the multiple indications, while discarding the other historical attributes. The processor can train the AI using the training data.

The processor can fill in missing data. Specifically, the processor can obtain multiple values associated with an attribute associated with multiple UEs. The processor can determine whether a subset of values among the multiple values is missing a value. Upon determining that the subset of values among the multiple values is missing, the processor can determine whether a number of values in the subset of values is below a predetermined threshold of a total number of the multiple values. For example, the processor can determine whether 30% of the values are missing. Upon determining that the number of values in the subset of values is below the predetermined threshold, the processor can replace the missing value with a predetermined value such as a 0 or a mean value of the existing value. If more than 30% of the values are missing, the processor can discard the whole attribute and not provide it to the AI.

The processor can indicate which UEs can generate higher lifetime value. Specifically, the processor can obtain multiple attributes associated with the UE including a number of employees associated with an entity associated with the UE and revenue associated with the entity associated with the UE. The processor can provide the multiple attributes to the AI. The processor can obtain from the AI an indication of a first multiplicity of UEs associated with higher lifetime value to the wireless telecommunication network. Lifetime value is the value obtained by the wireless telecommunication network during the relationship with the entity associated with the UE.

To obtain from the AI the indication of whether the UE will join the wireless telecommunication network, the processor can obtain a numerical value from the AI indicating whether the UE will join the wireless telecommunication network. The processor can obtain an indication of whether to emphasize precision or recall, where precision indicates how often the AI is correct in predicting that the UE will join the wireless telecommunication network, while recall indicates whether a machine learning (ML) model can predict all UEs that will join the wireless telecommunication network. Based on the indication of whether to emphasize the precision or the recall, the processor can adjust a threshold configured to be compared to the numerical value, where increasing the threshold increases precision, while decreasing the threshold increases recall.

Computer System

Figure 7:
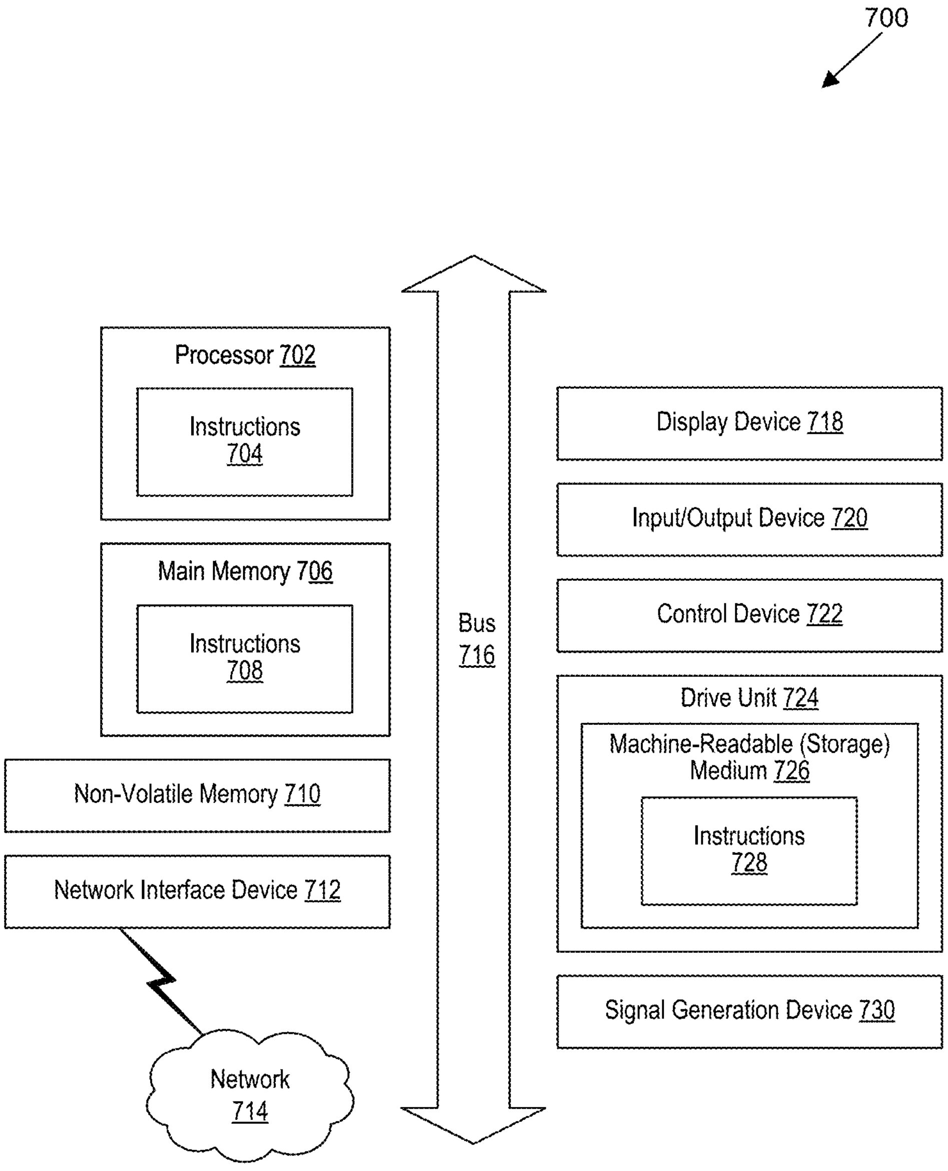
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, the instructions to predict whether a mobile device will join a wireless telecommunication network, wherein the instructions, when executed by at least one data processor of a system, cause the system to:

obtain multiple attributes associated with the mobile device, wherein the multiple attributes include a numerical value type or a categorical value type, wherein the multiple attributes include a lead age, an indication of a Data Universal Numbering System (DUNS) confidence score, an indication of whether a website associated with the mobile device is provided, and an indication of a source associated with the mobile device, wherein the lead age indicates an amount of time since the mobile device contacted the wireless telecommunication network, wherein the DUNS confidence score indicates reliability associated with the mobile device, and wherein the source associated with the mobile device indicates whether the mobile device entered a physical premises associated with the wireless telecommunication network;

convert a portion of the multiple attributes having the categorical value type into the numerical value type to obtain a converted attribute;

provide the converted attribute and a portion of the multiple attributes having the numerical value type to an artificial intelligence (AI);

obtain from the AI an indication of whether the mobile device will join the wireless telecommunication network; and upon determining that the mobile device will join the wireless telecommunication network, initiate a communication associated with the mobile device.

2. The non-transitory, computer-readable storage medium of claim 1, comprising instructions to:

obtain multiple historical attributes associated with multiple mobile devices not belonging to the wireless telecommunication network, wherein the multiple historical attributes include a second lead age associated with a second mobile device among the multiple mobile devices, a second indication of a DUNS confidence score associated with the second mobile device among the multiple mobile devices, a second indication of whether a second website associated with the second mobile device among the multiple mobile devices is provided, and a second indication of a second source associated with the second mobile device among the multiple mobile devices;

analyze the multiple historical attributes to determine a correlation between a historical attribute among the multiple historical attributes and an indication that the second mobile device associated with the historical attribute joined the wireless telecommunication network;

obtain multiple indications associated with multiple correlations between the multiple historical attributes and multiple indications of the multiple mobile devices that joined the wireless telecommunication network;

normalize the multiple indications associated with multiple correlations to a predetermined range;

rank the multiple indications associated with the multiple correlations in decreasing order to obtain a ranked list;

select a portion of the multiple indications from the ranked list, wherein the portion of the multiple indications satisfies a predetermined threshold within the predetermined range;

generate training data based on the portion of the multiple indications; and train the AI using the training data.

3. The non-transitory, computer-readable storage medium of claim 1, comprising instructions to:

obtain the multiple attributes associated with the mobile device including an indication of whether the DUNS confidence score exists, an indication of whether a Pardot grade is known, an indication of a data quality score, an indication of whether the source is self-entered, an indication of an email category, an indication of whether a Pardot score is unknown, an indication of a number of employees, an indication of whether the source is from Internet, an indication of an annual revenue associated with the mobile device, and an indication of whether an email associated with the mobile device is commercial, wherein the Pardot grade indicates the wireless telecommunication network's interest associated with the mobile device, wherein the data quality score indicates quality of data associated with the mobile device, and wherein the indication of the email category indicates whether the mobile device is associated with an international institution, commercial institution, educational institution, government institution, whether the email is provided, or whether a domain address is unknown.

4. The non-transitory, computer-readable storage medium of claim 1, comprising instructions to:

obtain multiple historical attributes associated with multiple mobile devices not belonging to the wireless telecommunication network, wherein the multiple historical attributes include a second lead age associated with a second mobile device among the multiple mobile devices, a second indication of a DUNS confidence score associated with the second mobile device among the multiple mobile devices, a second indication of whether a second website associated with the second mobile device among the multiple mobile devices is provided, and a second indication of a second source associated with the second mobile device among the multiple mobile devices;

analyze the multiple historical attributes to determine a correlation between a historical attribute among the multiple historical attributes and an indication that the second mobile device associated with the historical attribute joined the wireless telecommunication network;

determine whether the correlation satisfies a predetermined threshold;

upon determining that the correlation satisfies a predetermined threshold, generate training data based on the multiple historical attributes, wherein the training data includes the historical attribute and an indication of whether the second mobile device associated with the historical attribute joined the wireless telecommunication network; and train the AI using the training data.

5. The non-transitory, computer-readable storage medium of claim 1, comprising instructions to:

obtain multiple values associated with an attribute associated with multiple mobile devices;

determine whether a subset of values among the multiple values is missing a value;

upon determining that the subset of values among the multiple values is missing, determine whether a number of values in the subset of values is below a predetermined threshold of a total number of the multiple values; and upon determining that the number of values in the subset of values is below the predetermined threshold, replace the missing value with a predetermined value.

6. The non-transitory, computer-readable storage medium of claim 1, comprising instructions to:

obtain multiple attributes associated with the mobile device including a number of employees associated with an entity associated with the mobile device and revenue associated with the entity associated with the mobile device;

provide the multiple attributes to the AI; and obtain from the AI an indication of a first multiplicity of mobile devices associated with higher lifetime value to the wireless telecommunication network.

7. The non-transitory, computer-readable storage medium of claim 1, wherein the instructions to obtain from the AI the indication of whether the mobile device will join the wireless telecommunication network comprise instructions to:

obtain a numerical value from the AI indicating whether the mobile device will join the wireless telecommunication network;

obtain an indication of whether to emphasize precision or recall, wherein the precision indicates how often the AI is correct in predicting that the mobile device will join the wireless telecommunication network, and wherein the recall indicates whether a machine learning model can predict all mobile devices that will join the wireless telecommunication network; and based on the indication of whether to emphasize the precision or the recall, adjust a threshold configured to be compared to the numerical value, wherein increasing the threshold increases the precision, and wherein decreasing the threshold increases the recall.

8. A method comprising:

obtaining multiple attributes associated with a UE, wherein the multiple attributes include a numerical value type or a categorical value type, wherein the multiple attributes include at least two of: a lead age, an indication of a Data Universal Numbering System (DUNS) confidence score, an indication of whether a website associated with the UE is provided, and an indication of a source associated with the UE, wherein the lead age indicates an amount of time since the UE contacted a wireless telecommunication network, wherein the DUNS confidence score indicates reliability associated with the UE, and wherein the source associated with the UE indicates whether the UE entered a physical premises associated with the wireless telecommunication network;

converting a portion of the multiple attributes having the categorical value type into the numerical value type to obtain a converted attribute;

providing the converted attribute and a portion of the multiple attributes having the numerical value type to an artificial intelligence (AI);

obtaining from the AI an indication of whether the UE will join the wireless telecommunication network; and upon determining that the UE will join the wireless telecommunication network, initiating a communication associated with the UE.

9. The method of claim 8, comprising:

obtaining multiple attributes associated with the UE including an indication of whether the DUNS confidence score exists, an indication of whether a Pardot grade is known, an indication of a data quality score, an indication of whether the source is self-entered, an indication of an email category, an indication of whether a Pardot score is unknown, an indication of a number of employees, an indication of whether the source is from Internet, an indication of an annual revenue associated with the UE, or an indication of whether an email associated with the UE is commercial, wherein the Pardot grade indicates the wireless telecommunication network's interest associated with the UE, wherein the data quality score indicates quality of data associated with the UE, and wherein the indication of the email category indicates whether the UE is associated with an international institution, commercial institution, educational institution, government institution, whether the email is provided, or whether a domain address is unknown.

10. The method of claim 8, comprising:

obtaining multiple historical attributes associated with multiple UEs not belonging to the wireless telecommunication network, wherein the multiple historical attributes include a second lead age associated with a second UE among the multiple UEs, a second indication of a DUNS confidence score associated with the second UE among the multiple UEs, a second indication of whether a second website associated with the second UE among the multiple UEs is provided, and a second indication of a second source associated with the second UE among the multiple UEs;

analyzing the multiple historical attributes to determine a correlation between a historical attribute among the multiple historical attributes and an indication that the second UE associated with the historical attribute joined the wireless telecommunication network;

determining whether the correlation satisfies a predetermined threshold;

upon determining that the correlation satisfies a predetermined threshold, generating training data based on the multiple historical attributes, wherein the training data includes the historical attribute and an indication of whether the second UE associated with the historical attribute joined the wireless telecommunication network; and training the AI using the training data.

11. The method of claim 8, comprising:

obtaining multiple historical attributes associated with multiple UEs not belonging to the wireless telecommunication network, wherein the multiple historical attributes include a second lead age associated with a second UE among the multiple UEs, a second indication of a DUNS confidence score associated with the second UE among the multiple UEs, a second indication of whether a second website associated with the second UE among the multiple UEs is provided, and a second indication of a second source associated with the second UE among the multiple UEs;

analyzing the multiple historical attributes to determine a correlation between a historical attribute among the multiple historical attributes and an indication that the second UE associated with the historical attribute joined the wireless telecommunication network;

obtaining multiple indications associated with multiple correlations between the multiple historical attributes and multiple indications of the multiple UEs that joined the wireless telecommunication network;

normalizing the multiple indications associated with multiple correlations to a predetermined range;

ranking the multiple indications associated with the multiple correlations in decreasing order to obtain a ranked list;

selecting a portion of the multiple indications from the ranked list, wherein the portion of the multiple indications satisfies a predetermined threshold within the predetermined range;

generating training data based on the portion of the multiple indications; and training the AI using the training data.

12. The method of claim 8, comprising:

obtaining the multiple attributes associated with the UE including a number of employees associated with an entity associated with the UE and revenue associated with the entity associated with the UE;

providing the multiple attributes to the AI; and obtaining from the AI an indication of a first multiplicity of UEs associated with higher lifetime value to the wireless telecommunication network.

13. The method of claim 8, wherein obtaining from the AI the indication of whether the UE will join the wireless telecommunication network comprises:

obtaining a numerical value from the AI indicating whether the UE will join the wireless telecommunication network;

obtaining an indication of whether to emphasize precision or recall, wherein the precision indicates how often the AI is correct in predicting that the UE will join the wireless telecommunication network, and wherein the recall indicates whether an ML model can predict all UEs that will join the wireless telecommunication network; and based on the indication of whether to emphasize the precision or the recall, adjusting a threshold configured to be compared to the numerical value, wherein increasing the threshold increases the precision, and wherein decreasing the threshold increases the recall.

14. A system comprising:

at least one hardware processor; and at least one non-transitory memory storing instructions, which, when executed by the at least one hardware processor, cause the system to:

obtain multiple attributes associated with a UE, wherein the multiple attributes include a numerical value type or a categorical value type;

wherein the multiple attributes include at least two of: a lead age, an indication of a Data Universal Numbering System (DUNS) confidence score, an indication of whether a website associated with the UE is provided, and an indication of a source associated with the UE, wherein the lead age indicates an amount of time since the UE contacted a wireless telecommunication network, wherein the DUNS confidence score indicates reliability associated with the UE, and wherein the source associated with the UE indicates whether the UE entered a physical premises associated with the wireless telecommunication network;

convert a portion of the multiple attributes having the categorical value type into the numerical value type to obtain a converted attribute;

provide the converted attribute and a portion of the multiple attributes having the numerical value type to an artificial intelligence (AI);

obtain from the AI an indication of whether the UE will join the wireless telecommunication network; and upon determining that the UE will join the wireless telecommunication network, initiate a communication associated with the UE.

15. The system of claim 14, comprising instructions to:

obtain the multiple attributes associated with the UE including an indication of whether the DUNS confidence score exists, an indication of whether a Pardot grade is known, an indication of a data quality score, an indication of whether the source is self-entered, an indication of an email category, an indication of whether a Pardot score is unknown, an indication of a number of employees, an indication of whether the source is from Internet, an indication of an annual revenue associated with the UE, or an indication of whether an email associated with the UE is commercial, wherein the Pardot grade indicates the wireless telecommunication network's interest associated with the UE, wherein the data quality score indicates quality of data associated with the UE, and wherein the indication of the email category indicates whether the UE is associated with an international institution, commercial institution, educational institution, government institution, whether the email is provided, or whether a domain address is unknown.

16. The system of claim 14, comprising instructions to:

obtain multiple historical attributes associated with multiple UEs not belonging to the wireless telecommunication network, wherein the multiple historical attributes include a second lead age associated with a second UE among the multiple UEs, a second indication of a DUNS confidence score associated with the second UE among the multiple UEs, a second indication of whether a second website associated with the second UE among the multiple UEs is provided, and a second indication of a second source associated with the second UE among the multiple UEs;

analyze the multiple historical attributes to determine a correlation between a historical attribute among the multiple historical attributes and an indication that the second UE associated with the historical attribute joined the wireless telecommunication network;

determine whether the correlation satisfies a predetermined threshold; and upon determining that the correlation satisfies a predetermined threshold, generate training data based on the multiple historical attributes, wherein the training data includes the historical attribute and an indication of whether the second UE associated with the historical attribute joined the wireless telecommunication network; and train the AI using the training data.

17. The system of claim 14, comprising instructions to:

obtain multiple historical attributes associated with multiple UEs not belonging to the wireless telecommunication network, wherein the multiple historical attributes include a second lead age associated with a second UE among the multiple UEs, a second indication of a DUNS confidence score associated with the second UE among the multiple UEs, a second indication of whether a second website associated with the second UE among the multiple UEs is provided, and a second indication of a second source associated with the second UE among the multiple UEs;

analyze the multiple historical attributes to determine a correlation between a historical attribute among the multiple historical attributes and an indication that the second UE associated with the historical attribute joined the wireless telecommunication network;

obtain multiple indications associated with multiple correlations between the multiple historical attributes and multiple indications of the multiple UEs that joined the wireless telecommunication network;

normalize the multiple indications associated with multiple correlations to a predetermined range;

rank the multiple indications associated with the multiple correlations in decreasing order to obtain a ranked list;

select a portion of the multiple indications from the ranked list, wherein the portion of the multiple indications satisfies a predetermined threshold within the predetermined range;

generate training data based on the portion of the multiple indications; and train the AI using the training data.

18. The system of claim 14, comprising instructions to:

obtain multiple values associated with an attribute associated with multiple UEs;

determine whether a subset of values among the multiple values is missing a value;

upon determining that the subset of values among the multiple values is missing, determine whether a number of values in the subset of values is below a predetermined threshold of a total number of the multiple values; and upon determining that the number of values in the subset of values is below the predetermined threshold, replace the missing value with a predetermined value.

19. The system of claim 14, comprising instructions to:

obtain multiple attributes associated with the UE including a number of employees associated with an entity associated with the UE and revenue associated with the entity associated with the UE;

provide the multiple attributes to the AI; and obtain from the AI an indication of a first multiplicity of UEs associated with higher lifetime value to the wireless telecommunication network.

20. The system of claim 14, wherein the instructions to obtain from the AI the indication of whether the UE will join the wireless telecommunication network comprise instructions to:

obtain a numerical value from the AI indicating whether the UE will join the wireless telecommunication network;

obtain an indication of whether to emphasize precision or recall, wherein the precision indicates how often the AI is correct in predicting that the UE will join the wireless telecommunication network, and wherein the recall indicates whether an ML model can predict all UEs that will join the wireless telecommunication network; and based on the indication of whether to emphasize the precision or the recall, adjust a threshold configured to be compared to the numerical value, wherein increasing the threshold increases the precision, and wherein decreasing the threshold increases the recall.

* * * * *